United States Patent
Mashkif et al.

(10) Patent No.: US 9,953,298 B2
(45) Date of Patent: Apr. 24, 2018

(54) CROSS-DOMAIN COLLABORATIVE CONFIGURATION MANAGEMENT

(71) Applicant: International Business Machines Corporation, Armonk, NY (US)

(72) Inventors: Nir Mashkif, Ein Carmel (IL); Aviad Sela, Yokneam (IL); Uri Shani, Kiriat Motzkin (IL)

(73) Assignee: International Business Machines Corporation, Armonk, NY (US)

(*) Notice: Subject to any disclaimer, the term of this patent is extended or adjusted under 35 U.S.C. 154(b) by 814 days.

(21) Appl. No.: 13/663,477

(22) Filed: Oct. 30, 2012

(65) Prior Publication Data

US 2014/0122613 A1    May 1, 2014

(51) Int. Cl.
*G06Q 10/10*    (2012.01)

(52) U.S. Cl.
CPC .................. *G06Q 10/101* (2013.01)

(58) Field of Classification Search
CPC ............ G06Q 10/101; G06Q 10/0631; G06Q 10/0875; G06Q 50/04; G06B 19/418
USPC .......................... 705/300; 709/205
See application file for complete search history.

(56) References Cited

U.S. PATENT DOCUMENTS

| | | | |
|---|---|---|---|
| 6,961,687 B1 * | 11/2005 | Myers et al. | 703/6 |
| 7,143,341 B1 | 11/2006 | Kohli | |
| 2002/0035450 A1 * | 3/2002 | Thackston | 703/1 |
| 2003/0195932 A1 * | 10/2003 | Tanabe et al. | 709/205 |
| 2005/0273850 A1 * | 12/2005 | Freund | H04L 63/0227 726/14 |
| 2008/0059942 A1 | 3/2008 | Brown et al. | |
| 2010/0031212 A1 * | 2/2010 | Dong | G06F 17/50 716/100 |
| 2011/0251975 A1 * | 10/2011 | Evans et al. | 705/348 |

OTHER PUBLICATIONS

IP.com, "Using Linking for Composite Contexts and Baselines", IPCOM000211104D, Electronic Publication: Sep. 20, 2011. URL: http://ip.com/IPCOM/000211104.
Pasquale, et al., "Distributed Cross-Domain Configuration Management", Service-Oriented Computing, Lecture Notes in Computer Science, pp. 622-636, 2009.

* cited by examiner

*Primary Examiner* — Maria C Santos-Diaz (57) ABSTRACT

A computerized method for cross-domain collaborative revision management of a common product. The method comprises: Monitoring a plurality of local revisions for each of a plurality of projects associated with the common product, each of the plurality of projects managed in one of a plurality of domain-specific configuration management tools; creating a collaborative baseline within a collaborative relationship hub synchronizing between a group of the plurality of local revisions selected from each of the plurality of projects; and assembling instructions of generating the common product according to the collaborative baseline.

17 Claims, 10 Drawing Sheets

| Attribute | T1 | T2 | T3 |
|---|---|---|---|
| RH-ID | 1112 | 1122 | 1133 |
| Tool Name | DOORs | Rhapsody | RSA |
| Group Of Interest | RM_31 | AM_11 | AM_11 |
| RH - Tool Plug-in Descriptor | Com. ibm.rh.plugin.doors | Com.ibm.rh.plugin.rhp | Com.ibm.rh..plugin.rsa |
|  |  |  |  |
| Tool-Project ID | Blue Car_XV12 | Blue Car_44XY | Blue_Car_3321 |
| Protocol Identification | Embedded-All Components | Embedded | Embedded- Per Component |
| Tool Project Name | Requirement For Blue Car | Power Engine Design | Dashboard Design |
| Project Components | C1, C2 | C3 | C4, C5 |
| Tool Machine (IP) | My.company | My.company | 111.11.11.22 |
| Tool Machine (Port) | 3443 | 5562 | 2234 |
|  |  |  |  |
| RH- Component ID | C1 | C3 | C4 |
| Component Name | Stake Holders Requirments | Power Train | Music Controls |
| Tool Component Identification ID | 389742087 | Jd1889sm | J1860a1nf00089 |
|  |  |  |  |
| RH- Component ID | C2 |  | C5 |
| Component Name | System Requirements |  | Gear |
| Tool Component Identification ID | 38dfsad7 |  | R234re |
|  |  |  |  |

|    | t1 | t2 | t3 | t4 | t5 | t6 | t7 | t8 | t9 |
|----|----|----|----|----|----|----|----|----|----|
| T1 | C1:R11-V1, C1:R12-V1 | C1:R11-V2 C2:R14-V1 | | Tool closed BL-T1B1 | C1-R11-V3 | C1:R12-V2 | | Tool closed BL-T1B2 | |
| T2 | C3:R21-V1 | | C3:R22-V1 C3:R21-V2 | | | | | | |
| T3 | C4:R31-V1 C5:R32-V1 | C4:R31-V2 | | Tool closed BL-T3B1 | C4:R31-V2 C4:R33-V1 | C5:R32-V2 | | | |

FIG. 7

| Project ID | Component ID | BL-Key | Tool Physical BL | REG-ID | LAST BL-KEY | Registry Resource Status |
|---|---|---|---|---|---|---|
| Blue Car_XV12 | C1 | BLK-1 | Null | REG-1 | Null | Created |
| Blue Car_XV12 | C2 | BLK-1 | Null | REG-2 | Null | Created |
| Blue Car_XV12 | C3 | BLK-2 | Null | REG-3 | Null | Created |
| Blue_Car_3321 | C4 | BLK-3 | Null | REG-4 | Null | Created |
| Blue_Car_3321 | C5 | BLK-4 | Null | REG-5 | Null | Created |
| | | Tool closed BL - T1B1 | | | | |
| Blue Car_XV12 | C1 | BLK-1 | T1B1 | REG-1 | Null | UPDATED |
| Blue Car_XV12 | C2 | BLK-1 | T1B1 | REG-2 | Null | UPDATED |
| Blue Car_XV12 | C1 | BLK-5 | Null | REG-6 | REG-1 | Created |
| Blue Car_XV12 | C2 | BLK-5 | Null | REG-7 | REG-2 | Created |
| | | Tool closed BL - T3B1 | | | | |
| Blue_Car_3321 | C4 | BLK-3 | T3B1 | REG-4 | Null | UPDATED |
| Blue_Car_3321 | C5 | BLK-4 | T3B1 | REG-5 | Null | UPDATED |
| Blue_Car_3321 | C4 | BLK-6 | Null | REG-8 | REG-4 | Created |
| Blue_Car_3321 | C5 | BLK-7 | Null | REG-9 | REG-5 | Created |
| | | | | | | |

FIG. 8

| Time | RH Resource ID | Tool Resource ID | RH Server REG ID | Status |
|---|---|---|---|---|
| t1 | I1 | R11-V1 | REG-1 | created |
|  | I2 | R12-V1 | REG-1 | created |
|  | I3 | R21-V1 | REG-3 | created |
|  | I4 | R31-V1 | REG-4 | created |
|  | I5 | R32-V1 | REG-5 | created |
| t2 | I1 | R11-V2 | REG-1 | updated |
|  | I6 | R14-V1 | REG-1 | created |
|  | I4 | R31-V2 | REG-4 | updated |
| t3 | I7 | R22-V1 | REG-3 | created |
|  | I3 | R21-V2 | REG-3 | updated |
| t4 |  |  |  |  |
| t5 | I8 | R11-V3 | REG-6 | created |
| t6 | I9 | R12-V2 | REG-7 | created |
|  | I10 | R31-V2 | REG-8 | created |
|  | I11 | R33-V1 | REG-8 | created |
| t7 | I12 | R32-V2 | REG-9 | created |
|  |  |  |  |  |

CROSS-DOMAIN COLLABORATIVE CONFIGURATION MANAGEMENT

BACKGROUND

The present invention, in some embodiments thereof, relates to project configuration management and, more specifically, but not exclusively, to configuration management in multi-disciplinary development projects.

Configuration management involves establishing and maintaining consistency between components of a system or a product throughout its lifecycle. Functional and physical attributes of the system are identified at various points in time. A systematic approach is applied to control changes to the identified attributes for the purpose of maintaining system integrity and traceability throughout the product's life cycle.

Configuration management practices include revision control and the establishment of baselines. Typical configuration and product lifetime management systems are known, for example in the fields of software or computer aided design and manufacturing (CAD CAM). Such solutions are monolithic, adhering to a specific domain or bound to specific configuration management providers. Typically, the development environment for each domain is independent to that of another other domain, along with a respective system for configuration management support.

SUMMARY

According to an aspect of some embodiments of the present invention there is provided a computerized method for cross-domain collaborative revision management. The method comprises monitoring a plurality of local revisions for each of a plurality of projects associated with a common product, creating, using a processor, a collaborative baseline within a collaborative relationship hub synchronizing between a group of the plurality of local revisions selected from each of the plurality of projects and assembling instructions of generating the common product according to the collaborative baseline.

According to an aspect of some embodiments of the present invention there is provided a computer program product for cross-domain collaborative revision management. The computer program product comprises a computer readable storage medium; first program instructions to monitor a plurality of local revisions for each of a plurality of projects associated with a common product, each of the plurality of projects managed in one of a plurality of domain-specific configuration management tools; second program instructions to create a collaborative baseline within a collaborative relationship hub synchronizing between a group of the plurality of local revisions selected from each of the plurality of projects; and third program instructions to assemble instructions of generating a product according to the collaborative baseline; wherein the first, second and third program instructions are stored on the computer readable storage medium.

According to an aspect of some embodiments of the present invention there is provided a system for cross-domain collaborative revision management; The system comprises a processor; a collaborative relationship hub which registers a plurality of domain-specific configuration management tools, each managing a plurality of project revisions selected from each of a plurality of projects; and at least one interface module communicating data regarding the plurality of project revisions to the collaborative relationship hub; wherein the collaborative relationship hub creates a collaborative baseline according to the respective plurality of project revisions from the at least one interface module.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to project configuration management and, more specifically, but not exclusively, to configuration management in multi-disciplinary development projects.

According to some embodiments of the present invention, there are provided efficient methods and systems of managing ordered collaborative baselines for cross tool configuration support in applications where different domains come together to provide a composite solution. This provides a cross-domain engineering solution having a synchronized control for requirement management, architecture modeling, mechanical design, electronic design and/or the like.

The methods and systems disclosed herein allow different applications of different domains to use existing domain specific configuration management applications and related project baselines while supporting the collaborative baselines for backup, documentation and/or management of a collaborative work by a collaborative relationship hub, such that the collaborative work is held while each of the different applications, also referred to herein as tools, maintains local versions of local projects and project baselines in their existing diverse domain-specific configuration management applications.

In some embodiments, the methods and systems add and/or associate between logical tags and objects of different domains (i.e. raw files, database tables or the like). The logical tags are used for generating and updating cross-domain baselines in a collaborative relationship hub, considering cross-domain development interoperability. The collaborative relationship hub allows cross-domain monitoring of product releases and milestones, for system failure root cause analysis, version rollback and/or restoration.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
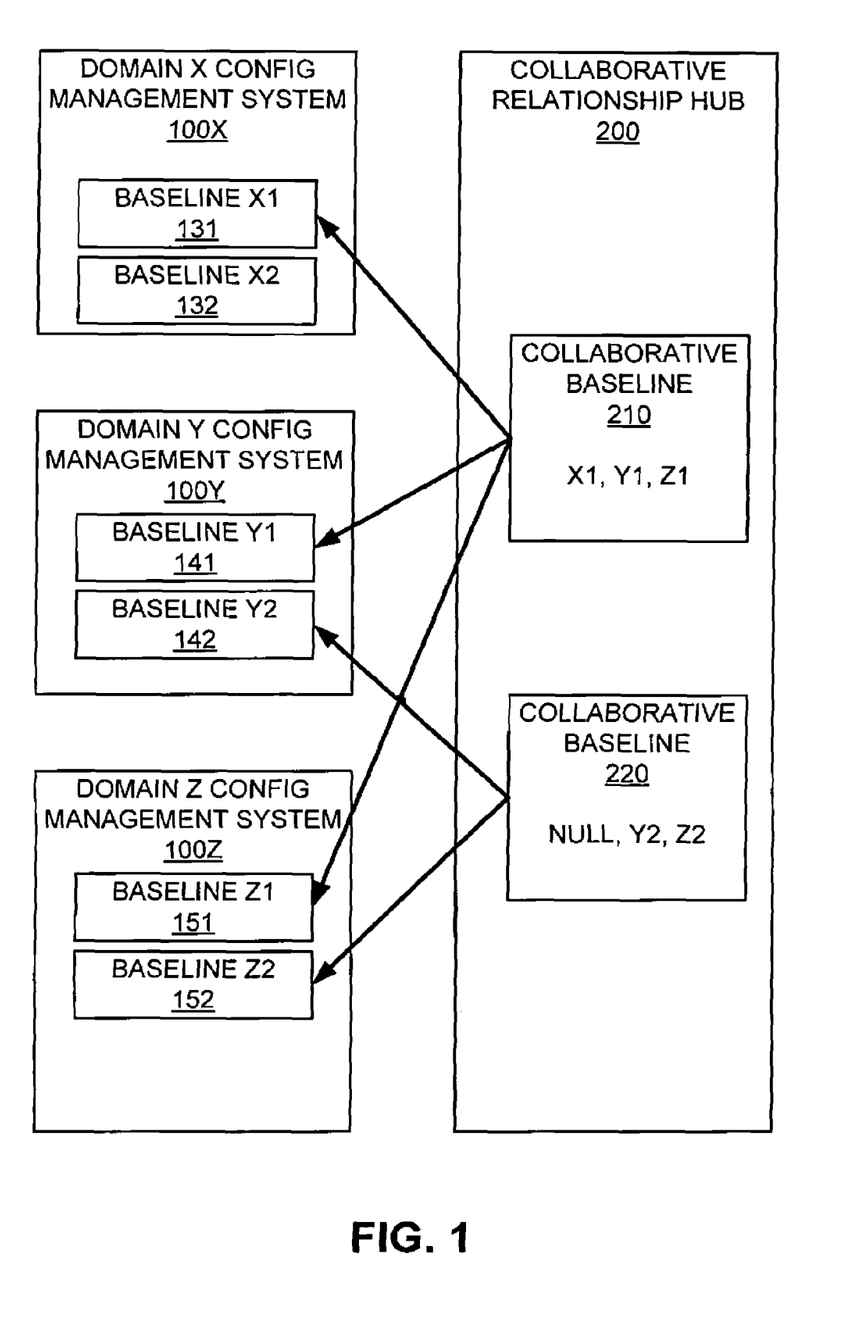
FIG. 1. is a schematic representation of relations between a collaborative relationship hub for cross-domain configuration management and a plurality of domain-specific configuration management tools, according to some embodiments of the present invention.

Reference is now made to FIG. 1, which is a schematic representation of the relations between a collaborative relationship hub for cross-domain configuration management and three exemplary domain-specific configuration management modules of different applications, according to some embodiments of the present invention. A collaborative relationship hub may be a server, a set of load-balanced servers or a cloud entity having a common access point and capable of communicating with a plurality of domain-specific configuration management tools.

The figure demonstrates project baseline management across domain specific configuration management modules of applications in three exemplary domains 100X, 100Y and 100Z using a collaborative relationship hub (RH) 200 for maintaining cross-domain collaborative baselines. It should be noted that any number of domain-specific configuration management applications in any number of domains may be collaborated using the relationship hub 200. Each domain may be a development field for product modules, for example mechanical engineering, electrical engineering and software engineering. Each domain maintains separate internal configuration management accountability, and publishes configuration information to a collaborative relationship hub 200 managed by a relationship hub server. The relationship hub server may be implemented as a multi-domain configuration management application independent of some or all of the domain-specific configuration management applications.

Within a single domain, several components may be combined into a single project. Significant states within the revision history of a project's configuration in a single domain are identified as project baselines. A collaborative baseline refers to a selection of significant states within the revision histories of a plurality of projects across a plurality of domains required for a multidisciplinary application.

For example, collaborative baseline 210 is shown as a set of three project baselines: 131 from domain X, 141 from domain Y and 151 from domain Z. For the purpose of illustration and without limitation, domains X, Y and Z may be represent the domains of software, electronics and mechanics respectively, such that collaborative relationship hub 200 manages cross-domain revisions of software, hardware and mechanical components used to assemble interdisciplinary modules such as an automobile.

Figure 2:
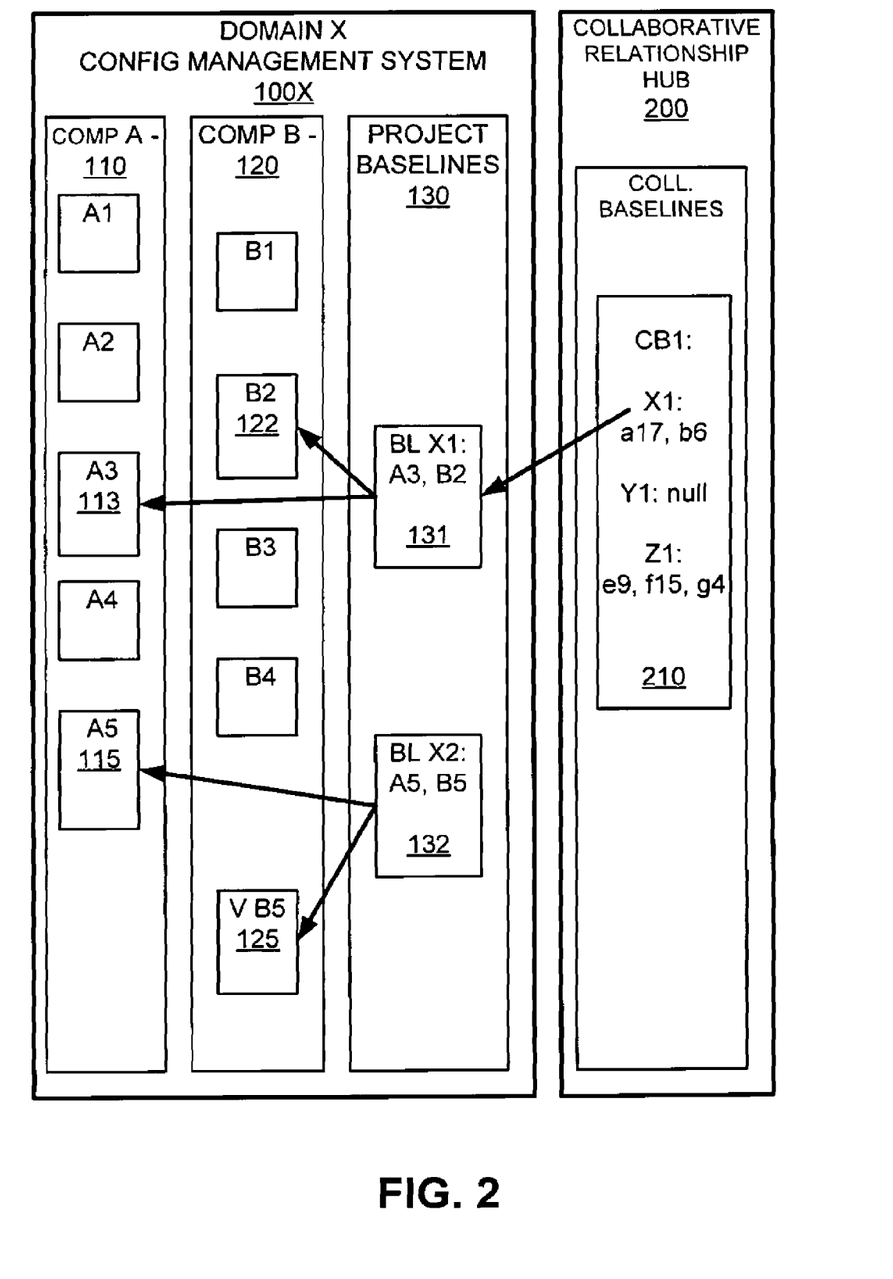
FIG. 2 is a schematic drill-down representation of the relations between a collaborative relationship hub and a single domain-specific configuration management tool, according to some embodiments of the present invention.

Reference is also made to FIG. 2, which is a schematic drill-down representation of the relations between collaborative relationship hub 200 and a single domain configuration management tool 100X, according to some embodiments of the present invention.

The figure demonstrates two components, component A 110 and component B 120 used in a single project within domain 100X. For example, and without limitation, assuming domain X refers to the field of software, component A 110 may be a software module responsible for the operation of a gear shift in a car, and component B 120 may be a software module responsible for temperature control within the car. Within the domain, a project-level management tool is used to manage project baselines comprising revisions from both components. For example, project baseline X1 131 comprises component A revision A3 113 and component B revision B2 122. Project baselines such as X1 131 are maintained within a domain-specific configuration management tool 100X, domain-specific configuration management tool as known in the art. Collaborative baselines such as 210 are maintained in collaborative relationship hub 200 configured to maintain interdisciplinary collaborative baselines of cross-project revisions. For example, collaborative baseline 210 refers to three project baselines from three different domain-specific configuration management tools, one of which is baseline X1 131 of domain configuration tool 100X which relates to revision A3 113 of component A and to revision B2 122 of component B.

The collaborative base line may have different accounts of tools specific baselines. Collaborative baselines may store only project baselines without additional properties, as shown in FIG. 1 where collaborative baseline 210 refers to X1 as is. Additionally and alternatively, a collaborative baseline may be made aware of internal configuration options within each of the components, as shown in FIG. 2 for component X1: a17 and b6 are each internal configuration attributes used in the configuration of internal components A 110 and B 120 of project X1. In some embodiments, collaborative baselines may be implemented like any other baseline in known version control systems. The collaborative baseline may be used to manage resources that are owned, created and maintained throughout their life cycle by the Relationship hub 200, resources which account for base lines in each of the participating domains.

The detailed structure of such resources may vary according to each implementation. An optional structure may be a vector of IDs which enables identification of the "physical baseline" in the contributing domain. Such a vector may contain data enabling access privileges to the contributing domain's management system, allowing retrieval of the detailed resources. Another optional structure is a container which maintains an ID of the "physical baseline" as mentioned earlier as well as a list of "replica" resources which account for detailed resources in the respective contributing domain, and one or more corresponding baseline in the respective domain-specific version control system.

The Collaborative Baselines manages resources that are owned, created and maintained throughout their life cycle by the Relationship hub 200. A list or a table of logical identification tags which comprises the content of the baselines is maintained. Logical tags may be referred to herein as logical identification tags (Logical IDs). Each such logical ID may comprise additional one or more mappings to physical baselines in the contributing domains' domain-specific configuration management systems. The Relationship Hub may serve as the primary storage for the contributing domains, or alternatively own one or more "replica" resource tables to detailed resources in the contributing domains. Both the primary storage resources and the indexing resources may maintain additional properties which refer to the abovementioned logical tags.

The detailed index resources (also referred to herein as "replica" resources) may require additional properties which reference logical IDs which were previously set for specific cross tool baseline resources. This enables mapping of domain-specific data resources to the management structures in the collaborative relationship hub 200.

Figure 10:
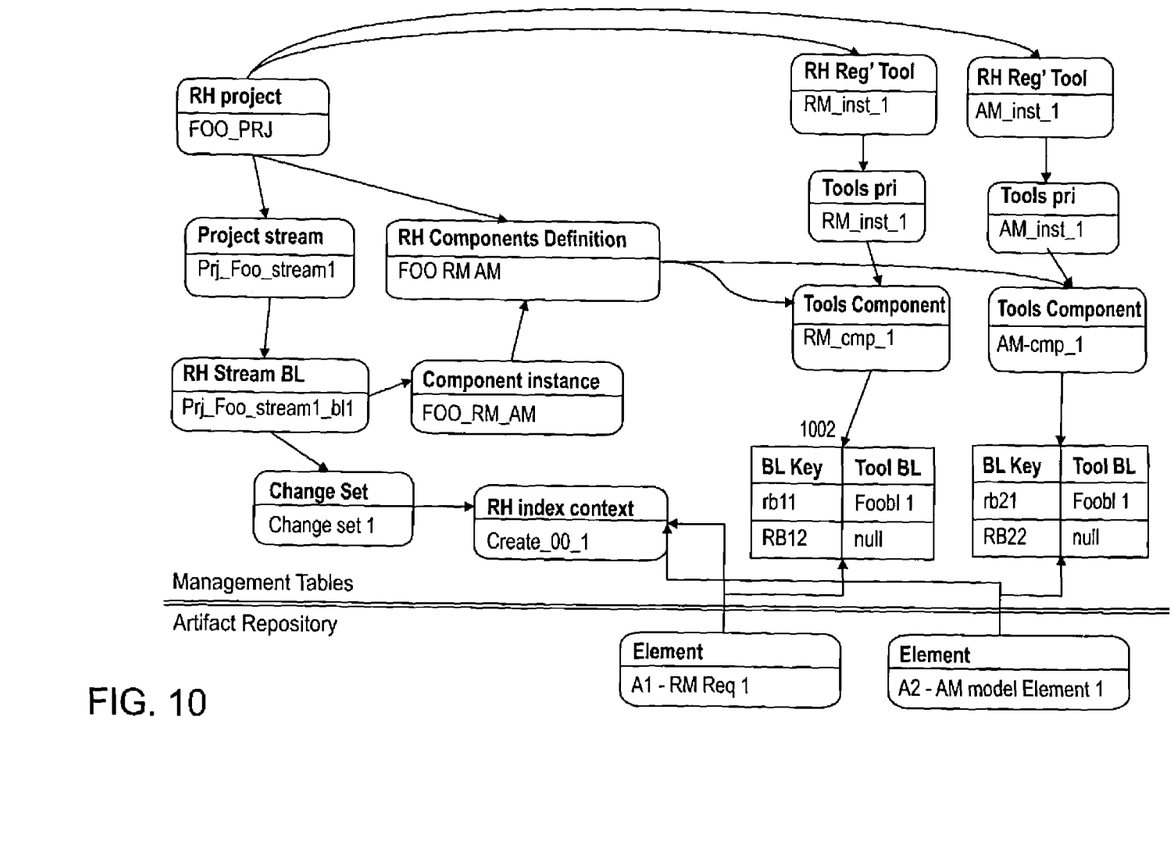
FIG. 10 is an exemplary diagram modeling management tables in a collaborative relationship hub, according to some embodiments of the present invention.

In some embodiments, allocation of index resources which relate to a specific cross tool baseline is enabled. Such index resources may be used to drill down and access domain-specific tools for any missing properties in the "replica" or for creating a report using one or more of internal RH "replica" properties. Reference is made to FIG. 10, which is an exemplary diagram modeling management tables in a collaborative relationship hub, according to some embodiments of the present invention. In table 1002, entry RB12 represents an exemplary logical identification tag (logical ID) for futuristic non closed baselines.

Figure 3:
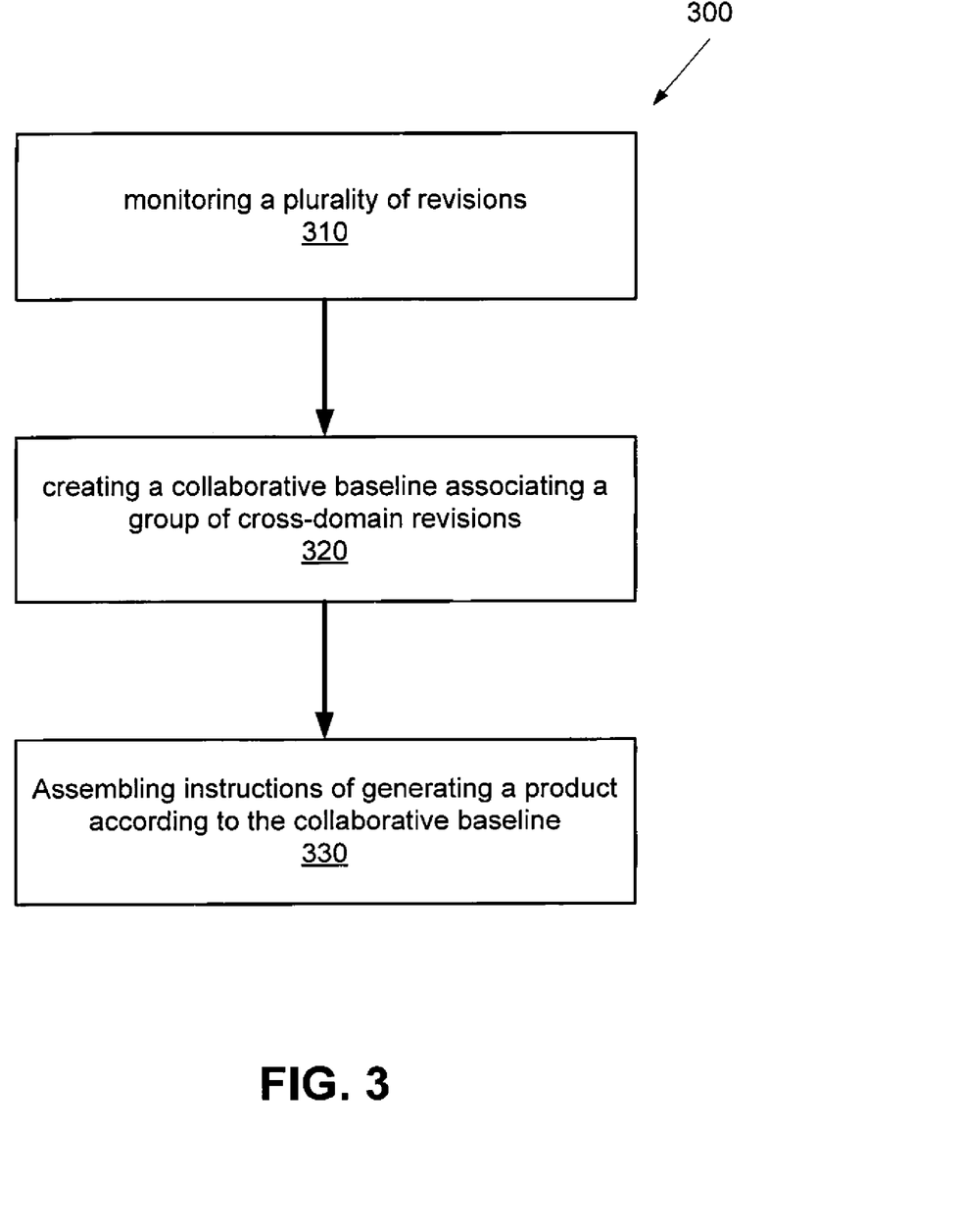
FIG. 3 is a flowchart of a method for managing collaborative revisions of cross-domain projects, according to some embodiments of the present invention.

Reference is now made to FIG. 3, which is a flowchart numeral of a method for managing collaborative revisions of multiple projects across a plurality of domains and revision management modules, according to some embodiments of the present invention.

The method comprises monitoring a plurality of component revisions 310 in a collaborative hub, wherein each revision relates to a component within a project managed by a module in a domain-specific configuration management tool for the respective domain. For example, a configuration management tool for mechanical parts of an automobile could be used for different projects such as car doors and truck doors; within each of these projects, a door handle component could have multiple designs, each kept in a separate revision.

Monitoring a plurality of component revisions 310 could comprise registration of component revision as database records within the collaborative hub. Registration is required for each component within each project within each domain. Once registered, a component receives a unique logical identification (ID) within the collaborative relationship hub. Selected revisions of the registered component can then be forwarded to the collaborative relationship hub and published using the logical ID. The logical identification tag RB12 is assigned and managed by the collaborative relationship hub.

Component boundary definitions may be entire projects, sets of packages or the like. Component boundary definitions are determined by domain management tools, and the collaborative relationship hub may work with any such definition. Each tool may expose a unique ID in the context of the project to identify it. The monitoring phase (either push/pull mode) can identify detailed resources in the context of such components.

Referring to the previous example, registration of a mechanical component such as a door handle for a car could include generating indexed entries in a reference table, entries such as the following:

Logical baseline within the RH for interdisciplinary module "car"—5
　Domain—mechanical parts 2
　Project—car door 7
　Component—handle 15
　Physical baseline per component—3

In this example, collaborative revision 5 of the interdisciplinary car project comprises revision 2.7.15.3 corresponding with version 3 of a mechanical design of a door handle (mechanical parts 2 | car door 7 | handle 15 | version 3).

Monitoring the revisions could be initiated by the collaborative relationship hub in the form of a query to the different configuration management tools in each of the domains, or alternatively revisions could be published by the configuration management tools to the relationship hub.

Preferably, revisions within the collaborative relationship hub are ordered. The order can be determined according to a timestamp in which the revision was created, the production cost of a revision, or any other order scheme which suits requirements and appears in the collaborative relationship hub registry.

Creating a collaborative baseline associating a group of cross-domain revisions 320 defined in project baselines follows. This can be performed by associating different physical components into a logical collaborative revision baseline within the collaborative relationship hub. A single collaborative revision aggregates multiple component revisions, each component related to a project within a domain, without a limitation on the identity of the projects, the domains, or the configuration management tools used to maintain the revisions. Similarly, a component revision may be used in a number of collaborative revisions, for example revision 2.7.15.3 could be referenced by a plurality of logical baselines in the collaborative RH.

Figure 4:
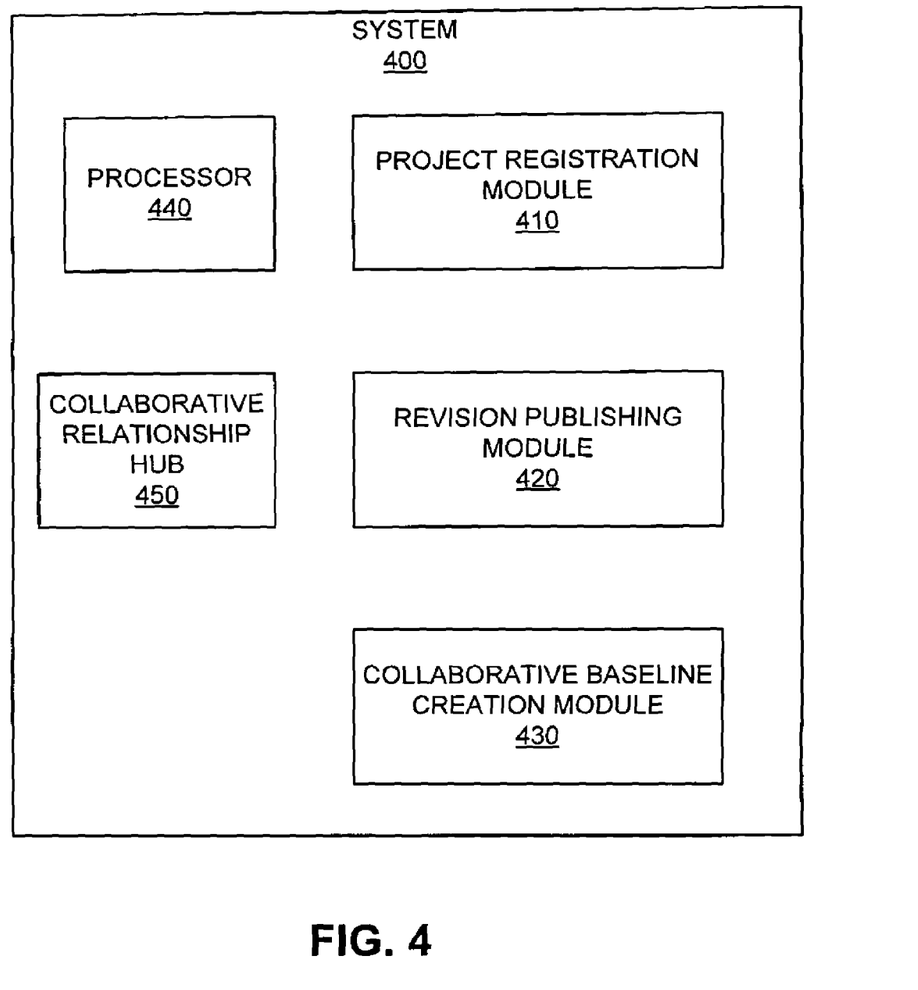
FIG. 4 is a relational view of software and hardware components of a system for managing collaborative revisions of cross-domain projects, according to some embodiments of the present invention.

Each such collaborative revision may then be used to assemble instructions of generating a product according to the project revisions within the collaborative baseline 330, by referencing specific revisions in each domain specific configuration management modules and optionally product assembly instruction revisions. These instructions of generating a common product may be of different formats such that they can be outputted to a user, a manufacturing module or the like. These instructions may be used not only for product assembly but also for tracing and analysis of failures in delivered instances of products. Reference is also made to FIG. 4 which is a relational view of software and hardware components of a system 400 for managing collaborative revisions of cross-domain projects, according to some embodiments of the present invention. The system numeral comprises a project registration module 410, a revision publishing module 420, a collaborative baseline creation module 430, a processor 440 and a collaborative relationship hub 450. For brevity, it should be noted that computing functions described herein may be performed using the processor 410. A plurality of collaborative configuration management system agents may be used to fill in the gaps for the interaction between the collaborative relationship hub 450 and each of the domain-specific configuration management tools.

Project registration module 410 is used for initialization and registration of projects monitored by each of the domain-specific configuration management tools within the collaborative relationship hub 450. An internal unique project ID is requested by each domain-specific configuration management tool for each of the projects and the registration module 410 provides a logical ID for the unique project ID and a collaborative project ID for creation of collaborative baselines.

Revision publishing module 420 enables each of the domain-specific configuration management tools to publish project revisions of components to the collaborative relationship hub. The revision publishing module 420 is responsible for managing the assignment of the logical tag IDs according to each resource notifications arriving from each of the domain-specific configuration management tools.

The collaborative baseline creation module 430 enables the creation of collaborative baselines by creating a collaborative baseline ID. The baseline creation module 430 supports cross-tool baseline lifecycle accounting and interconnectivity between the domain-specific configuration management tools and the collaboration relationship hub.

The baseline creation module 430 manages several interaction capabilities. In some interaction scenarios, a domain-specific configuration management tool closes an open-current baseline of some of its components and opens a new baseline. In other scenarios, an open cross-tool baseline is closed at the level of the collaboration relationship hub. Such scenarios indicate an intrinsic challenge, where the proposed embodiments support publishing of revisions into the collaborative RH using module 420, even though the revisions have not been previously associated to any base line in their originating domain-specific configuration management tool. Respective baselines will be closed at some point in the future by the tool users or administrator. Such baselines are referred to herein as "component physical baselines" which contribute to the identification of resources at the tool level during queries.

Referring to FIG. 4, a logical identification tag is assigned by the revision publishing module 420 in the collaborative relationship hub to any open component. The baseline creation module 430 maps the supplied project baseline ID to the corresponding logical ID. This logical ID, owned and managed by the collaboration relationship hub, logically represents the component's base line at the domain-specific configuration management tool.

In the first scenario, each of the domain-specific configuration management tools may access the baseline creation module 430 and notify of a closed baseline along with information of a newly created baseline, by supplying a project baseline ID which serves as a context for the reported baseline. Such a notification can be implemented using different protocols and messaging patterns.

In scenarios where the cross-tool baseline is closed, the collaborative baseline creation module 430 may access domain-specific configuration management tools and query for current revisions of components, closing a collaborative baseline comprising multiple revisions from multiple projects maintained and monitored by multiple domain-specific configuration management tools. In some embodiments, the collaborative baseline creation module 430 may signal each of the domain-specific configuration management tools to trigger closure of internal base lines. The collaborative baseline creation module 430 will receive as a response domain-specific configuration management tool physical base line IDs for the closed domain-specific baseline and the newly opened domain-specific baseline. The collaborative creation module 430 will use this information to map the logical tag ID. This is demonstrated in the management table shown in FIG. 8, which contains exemplary registration data maintained for each resource, according to some embodiments of the present invention. Some configuration management tools which do not support such queries may notify the collaborative RH when an internal baseline is closed, such that a logical tag in the collaborated configuration may be updated with a respective physical baseline ID at any point of time in the "future".

Publishing support requires cross-project management capabilities of associating the participating domain-specific configuration management tool and respective internal projects to a collaborative configuration, enabling replica data instances to be shared and associated back to the original domain-specific configuration management tool where the original instance is maintained.

A baseline registry is used by the collaborative relationship hub to monitor, reference and maintain a plurality of baselines from each of the domain-specific configuration management tools and their association to a collaboration global baseline. A protocol is used to enable communication between each of the domain specific configuration management tools, the collaborative configuration management and the baseline registry in a collaborative backend server. In some embodiments, the protocol comprises negotiating access points and mutual exchange of project and collaborative baseline IDs between each of the domain-specific configuration management tools and the collaborative backend server.

An exemplary project registration scenario is demonstrated herein for a new "Blue Car" collaborative project involving data stored in three domain-specific configuration management tools T1, T2 and T3. For example and without limitation, domain-specific configuration management tool T1 could be Rational DOORS of IBM used for requirement management (RM), and domain-specific configuration management tools T2 and T3 could be Rhapsody™ and Rational Software Architect (RSA) of IBM respectively, used for architecture management (AM). These domain-specific configuration management tools are used for maintaining project revisions within a domain, providing individual client interfaces (IDEs) of communication with the collaborative relationship hub.

Upon opening a collaborative project, attributes are registered in the collaborative relationship hub for the collaborative project, as well as for the different components and projects in each individual domain.

The collaborative relationship hub registration typically includes at least a subset of attributes indicated herein:

RH-ID: a string type universal unique identifier (UUID) representing the registered ID of the domain-specific configuration management tool and project in the collaborative relationship hub.

Tool Name: a string representing the name of the domain-specific configuration management tool.

Group of Interest: a reference to a categorization information schema which can be used to identify the domain of the data. One such example is associating the DOORs tool with Requirement Management (RM) domain. This field may be extended to any standardized domain or an ad-hoc categorization of the project, and indicate to the collaborative relationship hub which supporting procedures should be applied to interact with each of the domain-specific configuration management tools.

Relationship hub tool plug-in descriptor: a code package reference used for deploying a configuration management agent at the collaborative relationship hub server side. The agent may be used to fill in the gaps for the interaction between the collaborative relationship hub and the domain-specific configuration management tool.

The domain-specific configuration management tool's registration typically includes at least a subset of attributes indicated herein:

Tool-Project ID: string type universal unique identifier (UUID) representing the registered ID of the configuration management tool's project which is assigned by the collaborative relationship hub or the tool itself (depending on the interface between the tool and the collaborative relationship hub).

Protocol ID: a reference to the method of interaction with the tool and project.

Tool Project Name: a string representing the name of the project as kept within the domain-specific configuration management tool.

Project Components: list of references to the different components contributing and providing content to the collaborative project, whose configuration is managed within the domain-specific configuration management tool.

Tool Machine IP & Port: IP address (Ipv4 or Ipv6) or DNS name, along with a port number, identifying a connectivity endpoint for the domain-specific configuration management tool.

The project component's registration typically includes at least a subset of attributes indicated herein:

Relationship hub component ID: universal unique identifier (UUID) representing the registered ID of a specific component within the collaborative relationship hub. Such a UUID may be implemented in a number of variations such as a string type, a dedicated structure or the like.

Component name: a string representing the name of the component.

Tool Component ID: string type universal unique identifier (UUID) representing the assigned ID of the component in its respective domain-specific configuration management tool.

Figure 5:
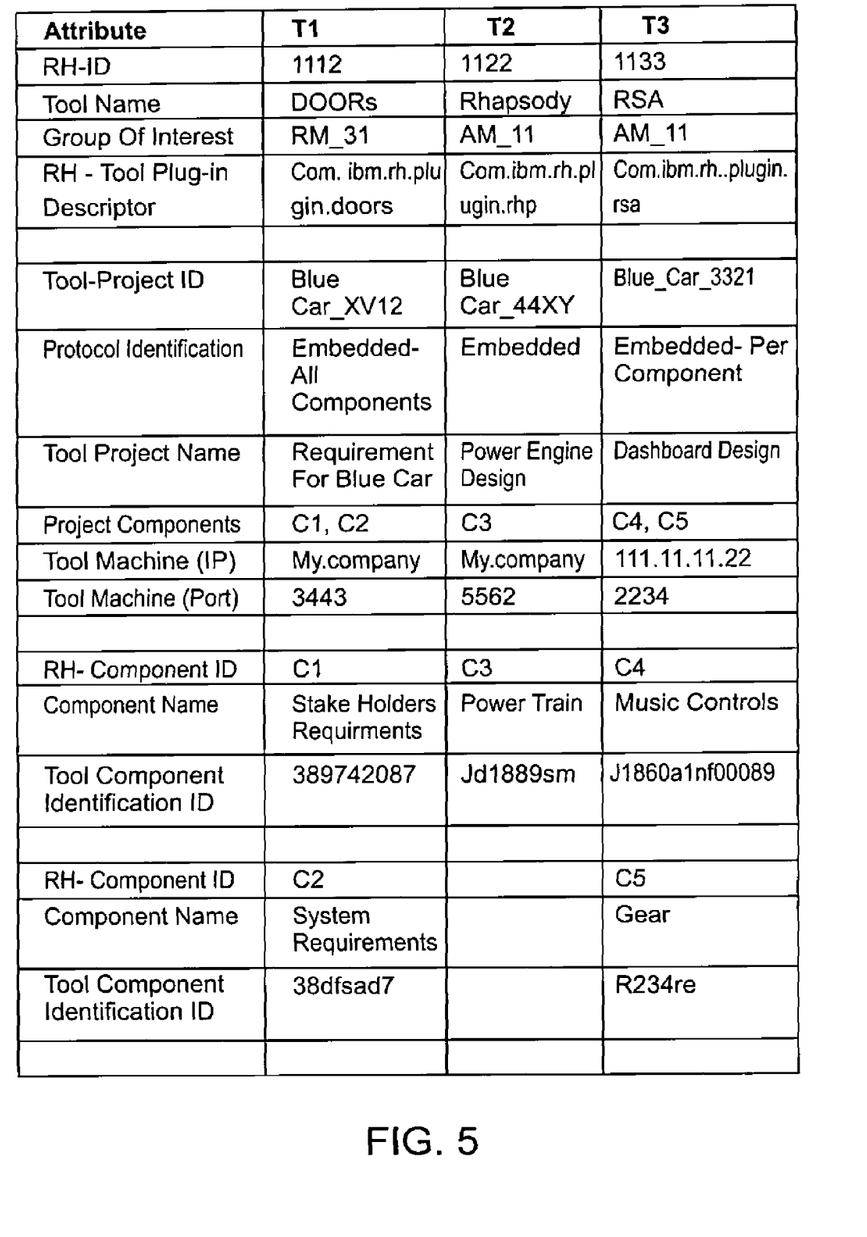
FIG. 5 is a table containing exemplary data for a collaborative project involving data stored in three domain-specific configuration management tools, according to some embodiments of the present invention.

Reference is made to FIG. 5, which is a table containing exemplary data for a collaborative project involving data stored in three domain-specific configuration management tools, according to some embodiments of the present invention. The table contains exemplary data classified according to the aforementioned attributes for the "Blue Car" collaborative project involving data stored in three domain-specific configuration management tools T1, T2 and T3. Configuration management tool T1 publishes components C1 and C2, configuration management tool T2 publishes component C3 and configuration management tool T3 publishes components C4 and C5.

Proposed attributes mentioned herein may reference a literal identification of the value, or rather indicate a reference to a more elaborated structure holding additional sub-configuration attributes required to support any protocol of interaction, relationship hub core features.

Figure 6:
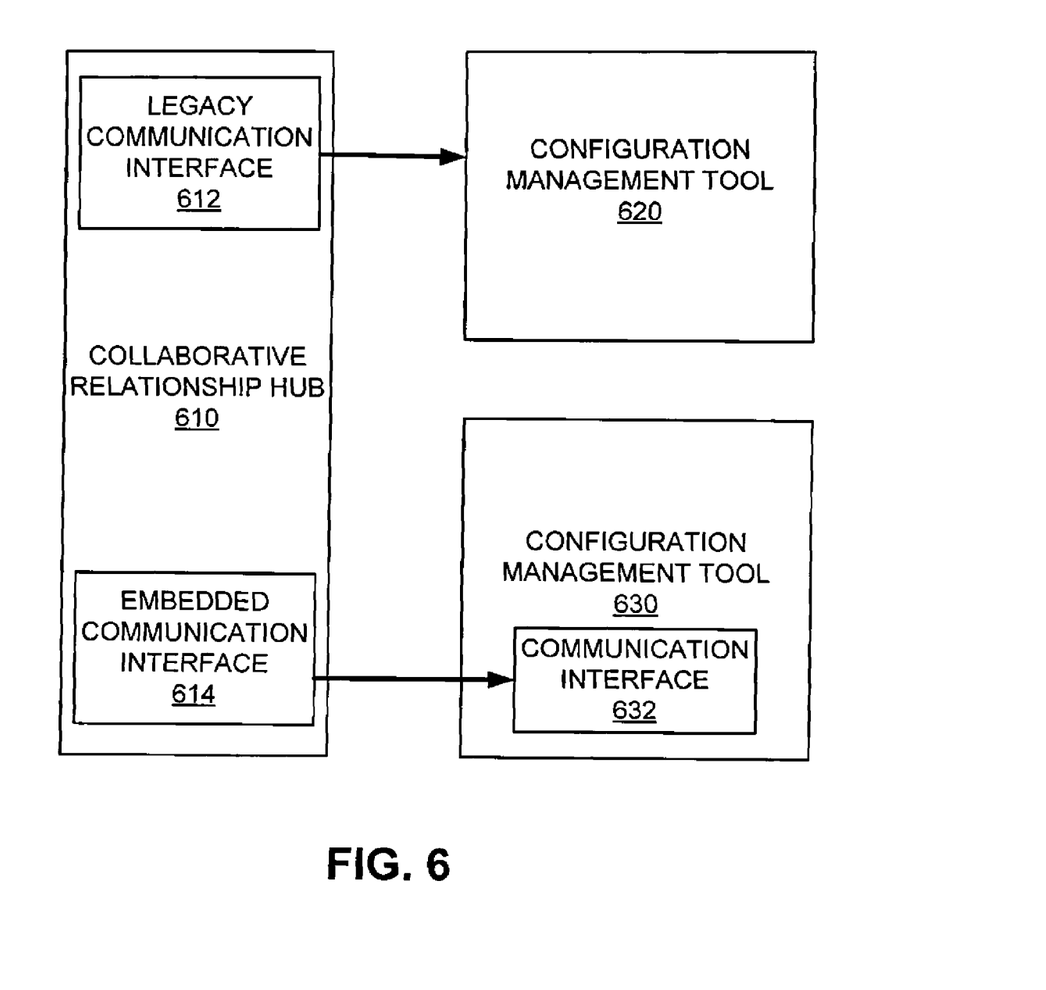
FIG. 6 is a schema demonstrating embedded and legacy communication interfaces between a relationship hub and domain-specific configuration management tools, according to some embodiments of the present invention.

Reference is made to FIG. 6, which is a schema demonstrating embedded and legacy communication interfaces between a collaborative relationship hub 610 and two domain-specific configuration management tools 620 and 630, according to some embodiments of the present invention. Registration enables a plurality of interaction protocols for communication between a domain-specific configuration management tool and the collaborative relationship hub. In an embedded deployment such as shown in tool 630, a tool provider 632 implements a set of interfaces required for administering the interaction between a domain-specific configuration management tool and the collaborative relationship hub. The relationship hub implements an embedded communication interface 614. In some embodiments, a dedicated embedded configuration interface may be provided for each of the domain-specific configuration management tools. This approach provides a consistent management of interactions between the relationship hub server and the different domain-specific configuration management tools. In some embodiments, a tool specific code package is deployed on the relationship hub acting as a server agent for the domain-specific configuration management tool and supporting dynamic discovery capabilities.

The interfaces enabling project registration and administration should cover the following basic operation and administration tasks:

Dynamic and/or static interaction and communication between the collaborative relationship hub and each of the tools—dynamic interaction requires a bi-directional agreement between collaborating parties on a set of communication interfaces and protocols. Static interaction is used when there is no such agreement, and interaction relies on server capabilities only. In static interaction, tool-specific administration, interaction and communication capabilities of a specific tool may be added to the collaborative relationship hub.

Discovery capabilities of the collaboration relationship hub of data within the domain-specific configuration management tool—discovery relates to interaction and communication enhancements, where additional analysis techniques may be used to achieve difficult tasks which are not made possible by existing dynamic and static administration, interaction and communication capabilities. Discovery analysis is based on incoming data from each of the tools, which enable retrieval of projects' attributes to be assigned to specific projects in the collaborative relationship hub. Domain-specific configuration management tools may be statically registered to a collaborative relationship hub, such that dynamic interaction between the domain-specific configuration management tools and the collaborative relationship hub server is not supported. An external adapter may be used to publish the domain-specific configuration management tool data and baseline information into the collaborative relationship hub server. Associating the data with corresponding projects and components is made possible by discovery techniques deployed using the external adapter optionally implemented as a plugin.

Assignment of configuration management system Project IDs—either statically where the collaborative relationship hub assigns and maintains the ID for the domain-specific configuration management tool, or dynamically where the domain-specific configuration management tool is in charge of assigning, maintaining and augmenting the ID for each resource published which can be accessed by a third party.

Assignment of projects' components—either statically where the relationship hub administration lists the expected components' names and respective tools ID, or dynamically where the domain-specific configuration management tool initiates component registration in the collaborative relationship hub and maintains each component's baseline.

Legacy deployment deals with integration of tools that do not support embedded RH interfaces. One or more different approaches may be used to bring the legacy tool on board, for example and without limitation adding adapters to such tools which enable the extraction of data from the legacy tools and publishing the data ("replica", index or base line info) back to the RH server. Each such adapter will be responsible to support the project administration tasks. It is possible that the domain-specific configuration management tool has already means to expose the data, exposure is generic and inconsistent with the RH requested embedded deployment interface. In such cases an integration expert may need to register the domain-specific configuration management tool's context and add analysis and discovery capabilities to the RH to work on the 'black box' data pulled from or pushed by the domain-specific configuration management tool.

In the discovery process of the embedded deployment, a predefined syntax such as but not limited to as a regular expression may be used for searching resource content, enabling runtime mapping of the resources to the registered project.

Alternatively, in a legacy deployment such as shown in tool 620, the collaborative relationship hub implements a legacy communication interface 612 in which internet protocol (IP)/Port registration and discovery techniques are used to identify resources source project/component pairs. This approach may use look-up tables generated by the relationship hub to assign project/components to incoming resources or any other analysis technique provided by the code package.

Figure 7:
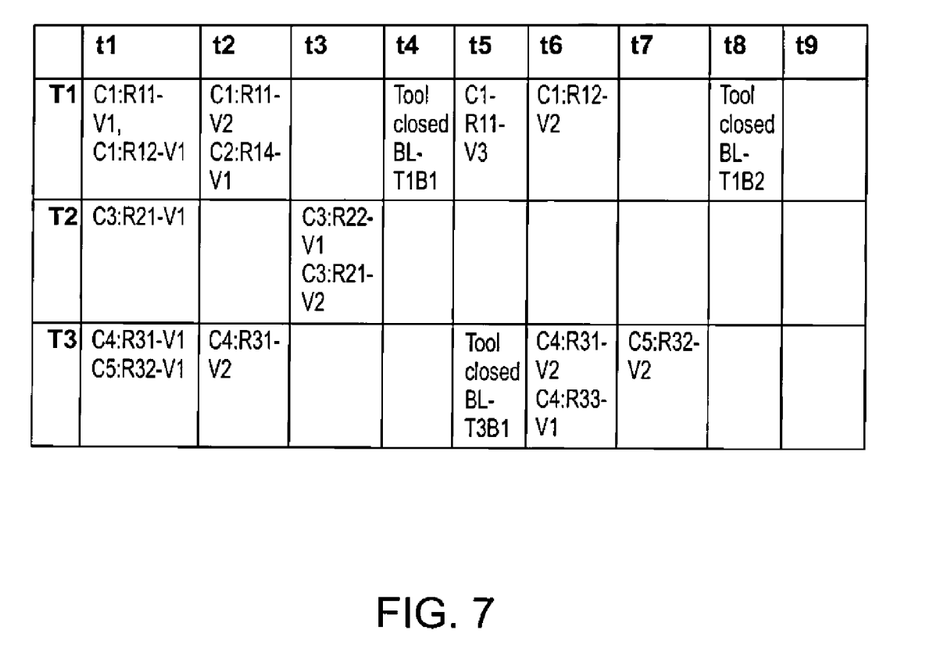
FIG. 7 is a table demonstrating a timeline of revisions created and maintained by each of three domain-specific configuration management tools according to some embodiments of the present invention.

Reference is made to FIG. 7, which is a table demonstrating a timeline of revisions created and maintained by each of three domain-specific configuration management tools according to some embodiments of the present invention. The table contains exemplary component revisions created and maintained by each of the domain-specific configuration management tools T1, T2 and T3 in each of time slots t1-t9. Baselines such as T1B1 initiated by T1 are also shown. This table demonstrates the time line of revision created and maintained by the three domain-specific configuration management tools whose corresponding project administration registration is visible in FIG. 5. The time line shown suggests that tools are publishing resources version identification associating these revisions to the tools components. It is possible that the tools are publishing just version info or possibly also "replica" of the resources to be stored by collaborative RH and used for indexing purposes as part of any "Discovery" required capabilities mentioned in this embodiment.

Figure 8:
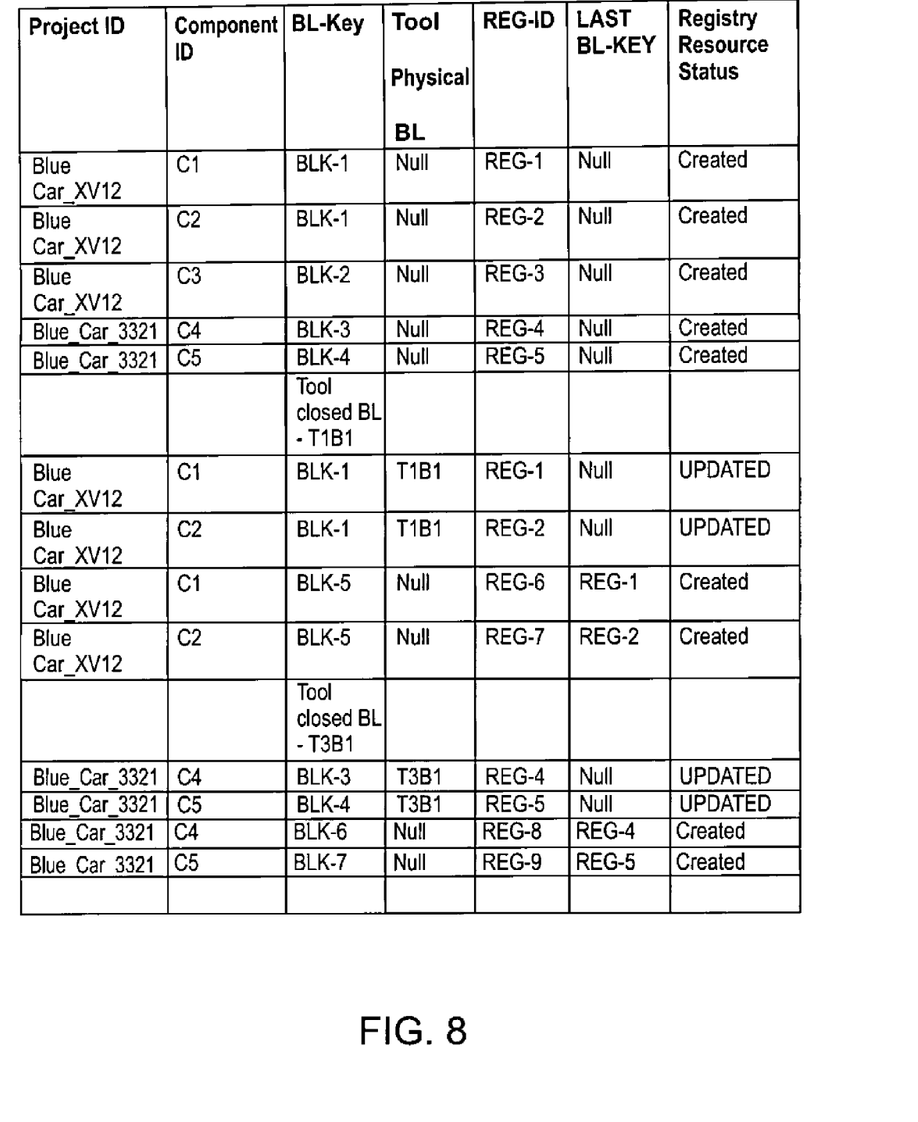
FIG. 8 is a table containing exemplary registration data maintained for each resource, according to some embodiments of the present invention.

In this example, in time 't1', tool T1 has published two resources R11 and R12 each belonging to the tool's registered component C1, where the tool's internal version is V1 for both resources R11 and R12. In time 't2' Tool T2 updates resource R11, notifies that its version is now V2, and a new resource R14 belonging to a new component C2 is created and published to server with version V1. The time line also implies that in the proposed environment each one of the tools can manage the internal base line life cycle following internal policy. Yet, such base lines creation are also updated and published to the collaborative RH server. Reference is also made to FIG. 8, which is a table containing exemplary registration data maintained for each resource, according to some embodiments of the present invention.

The table demonstrates registration details maintained by the RH server by modules 420 and 450 in FIG. 4, which accounts for the logical base line ID assigned by the RH server to each one of the domain specific tools according to the protocol identification class specified in FIG. 5. In order to support the creation of a collaborative base line, the RH server accounts for any resource notification. In this exemplary figure, each resource version is stored as part of the resource, while the registration accounts only for the components.

In case of domain-specific configuration management tool T1, it is demonstrated that when component C1 resources R11 and R12 are published a new entry is created, and the RH assigns the logical Base Line (BL) key of "BLK-1". Since the T1's internal base line is not known, relevant data is kept empty.

Once tool T1 publishes a new component C2, a new entry is created for it, yet since the protocol registered in FIG. 5. is "Embedded—ALL Component" the new component is assigned with the same logical base line tag "BLK-1" indicating that all components must be managed as a group.

When tool T1 baseline is closed, the registry updates the entries and assigns to both component the internal tool base line required for identification at the domain specific configuration management tool T1. Notice that for tool T3, two different BL-Key are assigned for each component C4 & C5 due to the protocol policy "Embedded—Per Tool".

The registration table also shows that when any new notification is received from the tool for an existing component, indicating that a tool internal base line is created; a new registry resource is created and a new BL-Key is assigned, also maintaining order reference to the last registry entry. For example for T1 when the base line is created, two new registry entries "REG-6" & "REG-7" are created for component C1 & C2 with BL key "BLK-5".

Figure 9:
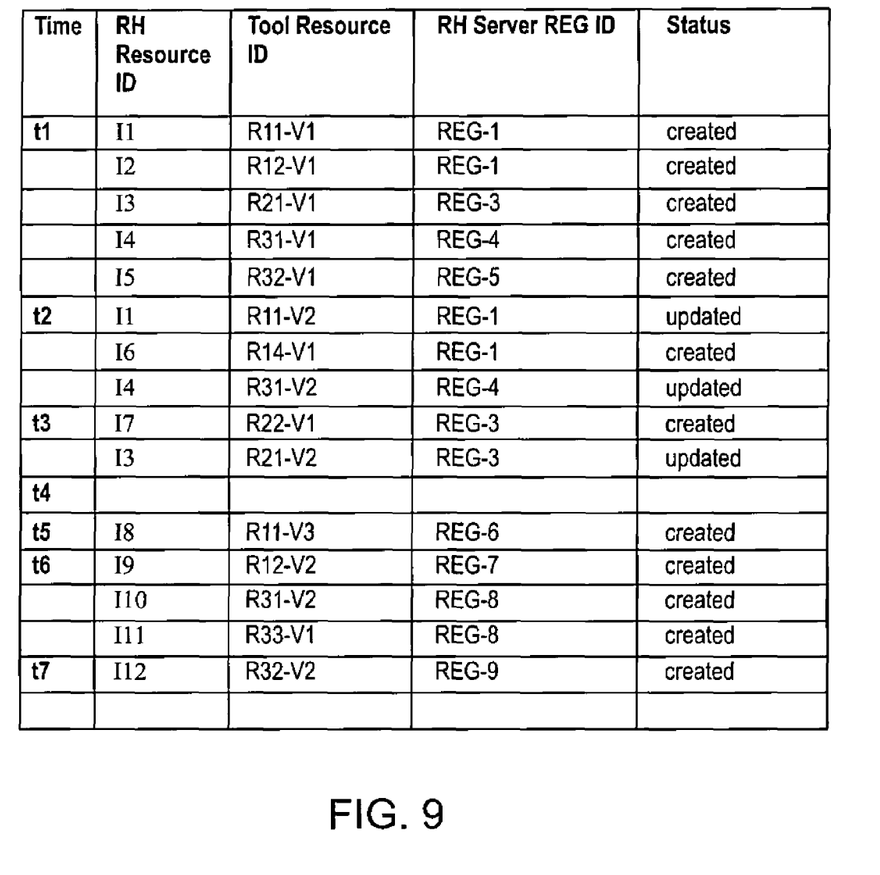
FIG. 9 is a table demonstrating the progression of a resource within a collaborative relationship hub registry over time, according to some embodiments of the present invention.

FIG. 9 is a table demonstrating the progression of resource revisions within a collaborative relationship hub registry over timeslots t1-t7, according to some embodiments of the present invention. Such table is redundant in case the RH does not receive "replica" publish. This table demonstrates the notion that in cases when RH server also stores "replica" of the individual resources existing in each one of the tools, Such "replica" may serve as indexing data to the actual tools resources. Each one of the resources also accounts for the logical base line key, referred also as baseline ID, by enriching the resource itself or by managing a dedicated table. In this example, each one of the resources maintains the internal tool version and a reference to the registration table in FIG. 8. The collaborative RH references the logical base line a resource corresponds with and the cross tool collaboration baseline that the resource participates in.

Note that each one of these examples may be implemented in many data structure as long as the nature of the underlying relations and details are preserved.

Embodiments of the methods and systems disclosed herein employ logical identification tags to identify and maintain local versions of components across different domain specific configuration management modules, and support the definition of collaborative baselines for their collaborative work.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the terms configuration management and baselines is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for cross-domain development interoperability of collaborative revision management, the method comprising:
   using at least one server, said server including at least one processor in communication over a network with a plurality of computer systems each executing a different of a plurality of domain-specific configuration management tools, each of said configuration management tools is managing and storing a plurality of project revisions of a plurality of domain-specific projects, and with a storage device storing program code for implementation by the at least one processor, to perform the following:
   registering within a database associated with said server, a plurality of local revisions selected from said plurality of project revisions of said plurality of domain-specific projects and associated with a common product, said registering comprising referencing to said plurality of local revisions;
   monitoring each of said registered plurality of local revisions by at least one of: issuing a query by said server to each of said domain-specific configuration management tools and receiving by said server local revisions published by said respective domain-specific configuration management tools;
   creating in a baseline registry stored in association with said server, an interdisciplinary collaborative baseline of cross-domain revisions defined in project baselines by said server synchronizing between a group of said plurality of local revisions according to significant states identified as project baselines within a history of said plurality of local revisions for each of said plurality of domain-specific projects; and
   assembling instructions of generating said common product according to said interdisciplinary collaborative baseline by referencing specific revisions in respective domain-specific configuration management tools.

2. The method of claim 1, further comprising outputting said instructions of generating said common product.

3. The method of claim 1, further comprising registering within said server said plurality of domain-specific configuration management tools, each managing said plurality of local revisions selected from each of said plurality of projects.

4. The method of claim 3, further comprising identifying at least one connectivity endpoint for each of said plurality of domain-specific configuration management tools.

5. The method of claim 4, wherein said identifying at least one connectivity endpoint further comprises IP and port registration for each of said plurality of domain-specific configuration management tools.

6. The method of claim 1, further comprising providing a set of interfaces for administering an interaction between each of said plurality of domain-specific configuration management tools and said server.

7. The method of claim 1, wherein said monitoring comprises assignment of IDs for each of said plurality of projects within each of said domain-specific configuration management tools.

8. The method of claim 6, wherein said administering the interaction comprises dynamic bi-directional agreements on a set of communication interfaces and protocols between at least one of said plurality of domain-specific configuration management tools and said server.

9. The method of claim 6, wherein said administering the interaction comprises adding tool-specific communication capabilities of at least one of said plurality of domain-specific configuration management tools to said server.

10. The method of claim 1, wherein said monitoring comprises providing a collaborative project ID and a logical ID for each of said plurality of local revisions for each of said plurality of projects within each of a plurality of domain-specific configuration management tools.

11. The method of claim 1, wherein said creating said interdisciplinary collaborative baseline of cross-domain revisions within said server comprises negotiating access points and exchange of project and collaborative baseline IDs between each of said domain specific configuration management tools and said baseline registry managed by said server.

12. A computer program product for cross-domain development interoperability of collaborative revision management, said computer program product for implementation by at least one server in communication over a network with a plurality of computer systems each executing a different of a plurality of domain-specific configuration management tools each of said configuration management tools is managing and storing a plurality of project revisions of a plurality of domain-projects, said computer program product comprising:
   a non-transitory computer readable storage medium;
   first program instructions to register, within a database associated with said server, a plurality of local revisions selected from said plurality of project revisions of said plurality of domain-specific projects and associated with a common product, said program instructions to register include instructions to reference to said plurality of local revisions;
   second program instructions to monitor each of said registered plurality of local revisions by at least one of: issuing a query by said server to each of said plurality of domain-specific configuration management tools, and receiving by said server local revisions each published by respective domain-specific configuration management tool;
   third program instructions to create in a baseline registry stored in association with said server, an interdisciplinary collaborative baseline of cross-domain revisions defined in project baselines by said server synchronizing between a group of said plurality of local revisions, according to significant states identified as project baselines within a history of said plurality of local revisions for each of said plurality of domain-specific projects; and
   fourth program instructions to assemble instructions of generating a product according to said collaborative baseline by referencing specific revisions in respective domain-specific configuration management tool;
   wherein said first, second third and fourth program instructions are stored on said non-transitory computer readable storage medium.

13. A system for cross-domain collaborative revision management, the system comprising:
   at least a server in communication over a network with a plurality of computer systems each executing a different of a plurality of domain-specific configuration management tools each of said configuration management tools is managing and storing a plurality of project revisions of a plurality of domain-specific projects, said server comprising:
   at least one processor;
   a storage device storing program code for implementation by the at least one processor, the program code comprising:
   instructions to register within a database associated with said server, a plurality of local revisions selected from said plurality of project revisions of said plurality of domain-specific projects and associated with a common product, said instructions to register include instructions to reference to said plurality of local revisions;
   instructions to monitor each of said registered plurality of local revisions using at least one interface module communicating data regarding said plurality of project revisions to said server, by at least one of: issuing a query by said server to each of said domain-specific configuration management tools at respective computer systems, and receiving by said server local revisions published by said respective domain-specific configuration management tools;
   and instructions to create in a baseline registry stored in association with said server, an interdisciplinary collaborative baseline of cross-domain revisions defined in project baselines by synchronizing between a group of said plurality of local revisions according to significant states identified as project baselines within a history of said plurality of local revisions for each of said plurality of domain-specific projects.

14. The system of claim 13, wherein said at least one interface module communicating data regarding said plurality of project revisions is deployed on said server.

15. The system of claim 13, wherein said at least one interface module communicating data regarding said plurality of project revisions is deployed in each of said plurality of domain-specific configuration management tools, each forwarding respective said plurality of project revisions to said server.

16. The system of claim 13, wherein said server registers an IP and port identifying a connectivity endpoint for each of said plurality of domain-specific configuration management tools.

17. The system of claim 13, wherein said server maintains a collaborative project ID and a logical ID for each of said plurality of project revisions.

* * * * *